United States Patent [19]
Johnson et al.

[11] Patent Number: 5,362,941
[45] Date of Patent: Nov. 8, 1994

[54] EXHAUST AND PARTICLE WASTES COLLECTING DEVICE FOR LASER ETCHING

[75] Inventors: Paul R. Johnson, Kaysville; James Bero, Ogden; Jeff Heitzman, Roy, all of Utah

[73] Assignee: Iomega Corporation, Roy, Utah

[21] Appl. No.: 897,295

[22] Filed: Jun. 11, 1992

[51] Int. Cl.$^5$ .............................................. B23K 26/16
[52] U.S. Cl. .......................... 219/121.84; 219/121.68; 219/121.69; 360/135
[58] Field of Search ...................... 219/121.68, 121.69, 219/121.84, 121.82; 360/135, 131; 346/76 L

[56] References Cited

U.S. PATENT DOCUMENTS

| | | | |
|---|---|---|---|
| 4,406,939 | 9/1983 | Golker | 219/121.69 |
| 4,961,123 | 10/1990 | Williams et al. | 360/131 |
| 5,120,927 | 6/1992 | Williams et al. | 219/121.68 |

OTHER PUBLICATIONS

Y. Y. Fan and V. M. Huynh, "Investigation of Light Scattering From Rough Periodic Surfaces-Numbered Solutions", Dept. of Mech. Eng. Univ. of Windsor, Ontario, Mar. 1992.
J. Mazumder, "Overview of Melt Dynamics in Laser Processing", Optical Engin., vol. 30, No. 8, pp. 1208-1219, Aug. 1991.
M. W. Sasnett and T. F. Johnston, Jr., "Beam Characterization and Measurement of Propagation Attributes", Laser Beam Diagnostics, SPIE vol. 1414, Los Angeles 1991.
F. Jorgensen, "The Complete Handbook of Magnetic Recording" 3rd Edition, TAB Books, Inc., Blue Ridge Summit, Pa. 1988.

*Primary Examiner*—C. L. Albritton
*Attorney, Agent, or Firm*—Woodcock Washburn Kurtz Mackiewicz & Norris

[57] ABSTRACT

The current invention provides an apparatus and method of collecting waste materials produced during laser etching of a floptical medium without blocking access to the medium surface. The invention also improves collection efficiency by applying a uniform low-pressure air around the outer edge of the medium. Because the air pressure is applied around the edge, there is no necessity to coordinate a movement or timing of the current invention with respect to the laser etching unit.

19 Claims, 3 Drawing Sheets

FIG. I 5,362,941

EXHAUST AND PARTICLE WASTES COLLECTING DEVICE FOR LASER ETCHING

FIELD OF THE INVENTION

The current invention is related to a method of and an apparatus for collecting waste materials during laser etching of a floptical medium, and more particularly to a method of and apparatus for applying uniform low-pressure air around an entire outer edge of the floptical medium.

Background of the Invention

Recently, floppy disk systems have been developed that combine magnetic disk recording techniques with the high track capacity servos found in optical disk systems. Such a system is described in AN INTRODUCTION TO THE INSITE 325 FLOPTICAL(R) DISK DRIVE, Godwin, which was presented at the SPIE Optical Data Storage Topical Meeting (1989). Essentially, an optical servo pattern is pre-recorded on a magnetic floppy disk. The optical servo pattern typically consists of a large number of equally spaced concentric tracks about the rotational axis of the disk. Data is stored in the magnetic "tracks" between the optical servo tracks using conventional magnetic recording techniques. An optical servo mechanism is provided to guide the magnetic read/write head accurately over the data between the optical servo tracks. By utilizing optical servo techniques, much higher track densities are available on the relatively inexpensive removable magnetic medium.

As mentioned, the optical servo pattern typically consists of a large number of equally spaced concentric tracks about the rotational axis of the disk. As disclosed in U.S. Pat. No. 4,961,123, each track may be a single continuous groove (FIG. 3), a plurality of equally spaced circular pits (FIG. 8), or a plurality of short equally spaced grooves or stitches (FIG. 9). Various methods and systems exist for inscribing the optical servo tracks on the magnetic medium.

For example, U.S. Pat. No. 4,961,123, entitled "Magnetic Information Media Storage With Optical Servo Tracks," discloses a method of and apparatus for etching the servo track pattern on a disk using a laser. During the laser etching of the floptical media, smoke and particulate wastes are generated. The size of etched debris is in the order of micron or sub-micron. These materials are hazardous to an operator of the laser etching machine. These materials can also be deposited onto the optics of the laser system thereby degrading its performance.

In order to solve the above mentioned problems, for example, Williams et al (U.S. Pat. No. 4,961,123) invented the debris evacuation system. A pair of tubes is disposed in a unit and follows a etching location on the surface of a disk as the laser beam travels. This unit is placed near the etching location so that one tube blows air while the other sucks the debris and smoke. However, the movement of this unit must be coordinated with respect to the laser unit. Thus, constant adjustments require a sophisticated system. In addition, this evacuation system hinders some access to the surface of the floptical medium. Because the unit containing the pair of tubes is placed immediately adjacent to the etching location, some area of the floptical medium is not directly accessible or visible to an operator. When etching is completed and the medium is removed from the etching system, this tube unit hinders an efficient removal and replacement of the medium.

Some improvement has been made to the above described problem. For example, one suction tube is attached to the bottom of the laser positioning arm. This tube extends to the etching site so that the movement of the tube does not have to be coordinated. However, the suction tube still creates an access problem during laser alignment procedures. These tube-based systems are also limited by a small area where suction is applied. Since the medium is rotated at a high speed during etching, only a small portion of etched surface on the same track is covered by the tube at a given instant.

The current invention solves the above mentioned problems. One object of the current invention is to provide a debris/smoke removal system during etching that does not block any access to the surface of the etched medium. Further object of the invention is to protect the operator and the laser unit from smoke and particulate wastes. Another objective is to apply a uniform low-pressure air to a larger area for collecting debris and smoke. Yet another object of the current invention is to provide a debris/smoke removal system that functions independently from the location and timing of the laser etching unit.

SUMMARY OF THE INVENTION

The current invention provides a method of and apparatus for collecting waste materials during laser etching of a floptical medium. An apparatus comprises a spindle which rotates the floptical medium to be etched. Due to a pumping effect caused by rotation, exhaust and particulate wastes produced during etching are transported by an air flow towards the outer edges of the medium. When the wastes reach the outer edge of the medium, the air flow is further guided by the platen towards its edge. The shroud is placed around the outer edge of the platen in such a way to create a uniform circular gap between the inner surface of the shroud and the outer edge of the platen. A Low pressure air is applied to the gap to further transport the waste materials towards the gap along the top surface of the platen. The wastes are trapped in a filter after being collected through the gap.

A method of collecting wastes during laser etching comprises the steps of a) mounting the medium, b) rotating the medium, c) etching the medium, while rotating so that a pumping effect carries the wastes towards the outer edge of the rotating medium, d) uniformly applying low-pressure air around an entire outer edge of the rotating medium, so that the wastes are further transported by the low-pressure air towards the vacuum source, and e) collecting the wastes in a filter.

DETAILED DESCRIPTION OF THE PREFERRED EMBODIMENT

Figure 1:
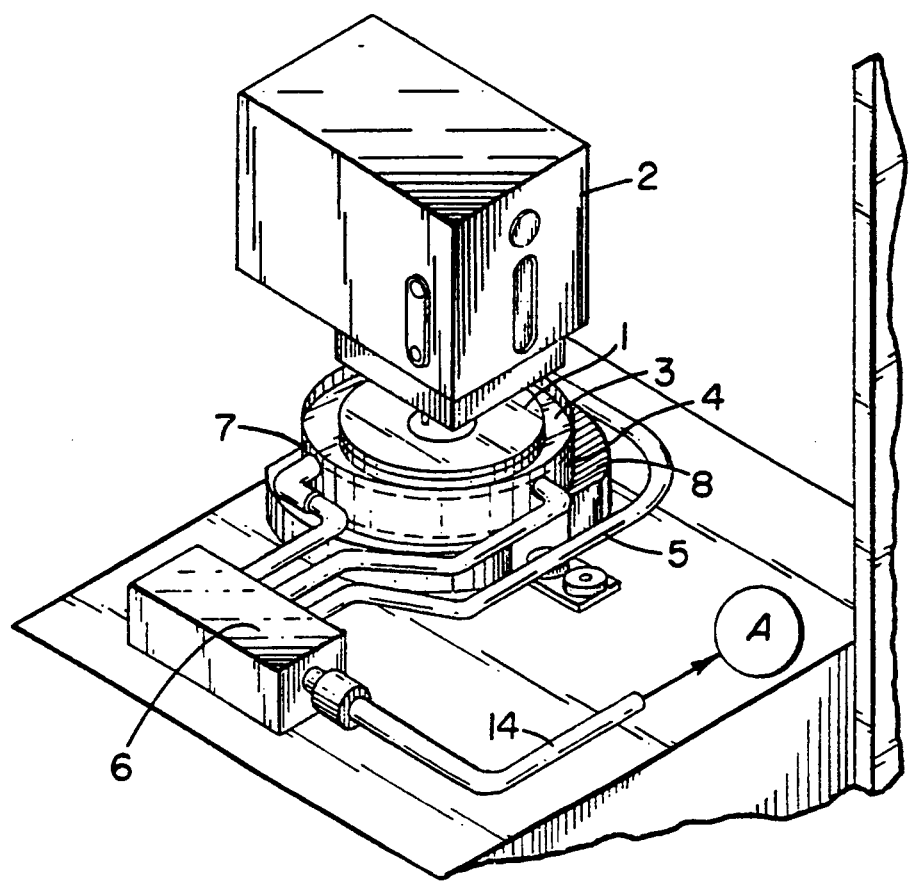
FIG. 1 is a plan view of the exhaust and particulate waste collecting device of the current invention placed along with the laser etching device.

FIG. 1 shows a preferred embodiment of a plan view of the exhaust and particulate waste collecting device of the current invention along with the laser etching device. The disk 1 is placed on the spindle 7 and is rotated at approximately 3400 RPM during laser etching. The laser positioning arm unit 2 is positioned over the rotating disk 1. A beam of light is focused upon a small spot of the rotating disk 1 to etch a series of concentric tracks on the disk surface. The laser positioning arm 2 is moved so that the focused beam travels along the radius of the disk to create a series of the concentric tracks.

The disk 1 is rotated in a parallel plane of the platen 3. The outer edge of the platen 3 is surrounded by the shroud 4. The shroud 4 extends in a perpendicular plane to the platen 3 beyond the disk 1 and below the top surface of the platen 3. The shroud 4 functions as a protective cover so that the direct line of the focused beam is directly observable by an operator. The vacuum access pipes 5 are attached to a corresponding bore on the outer surface of the shroud 4. These vacuum lines 5 are connected to a manifold box 6 for a common vacuum source. The manifold box 6 is connected to the vacuum source via the pipe 14. The platen 3, spindle 7 and the shroud 4 rest upon the spindle mounting flange 8.

Figure 2:
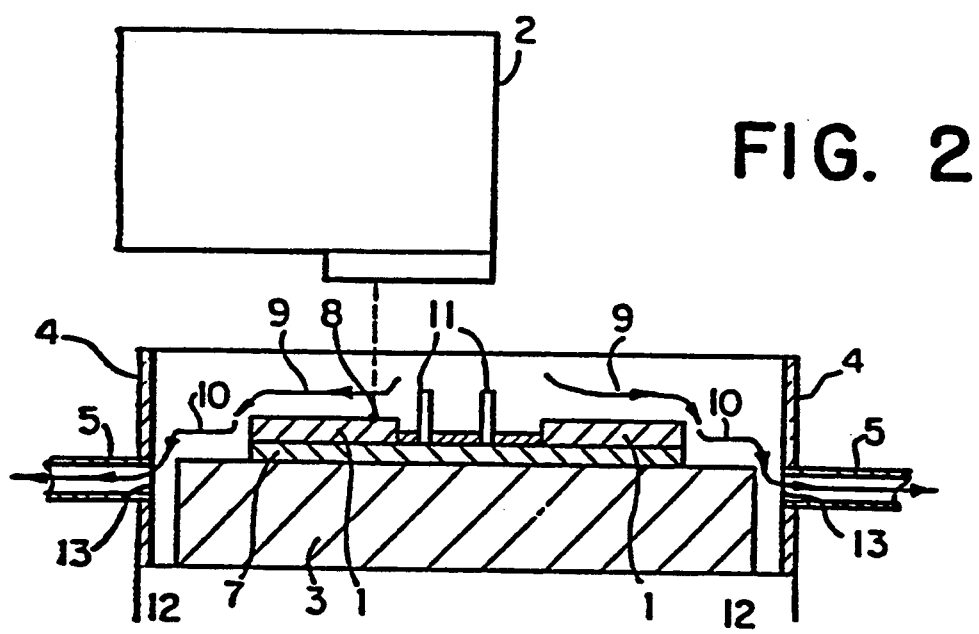
FIG. 2 is a cross sectional view of the current invention taken at A—A' of FIG. 1.

Referring to FIG. 2, a cross sectional view is taken at A—A' of FIG. 1. The disk 1 is placed on the spindle 7 and locked by the locking pins 11 for rotation. The gap 12 is created by the outer vertical surface of the platen 3 and the inner surface of the shroud 4. The gap 12 is uniform around the entire circumference of the platen 3. The preferred embodiment has a gap size of 1/16". The vacuum line 5 are attached to a corresponding bore 13 on the outer surface of the shroud 4. The bores 13 are located below the top surface of the platen 3.

Figure 3:
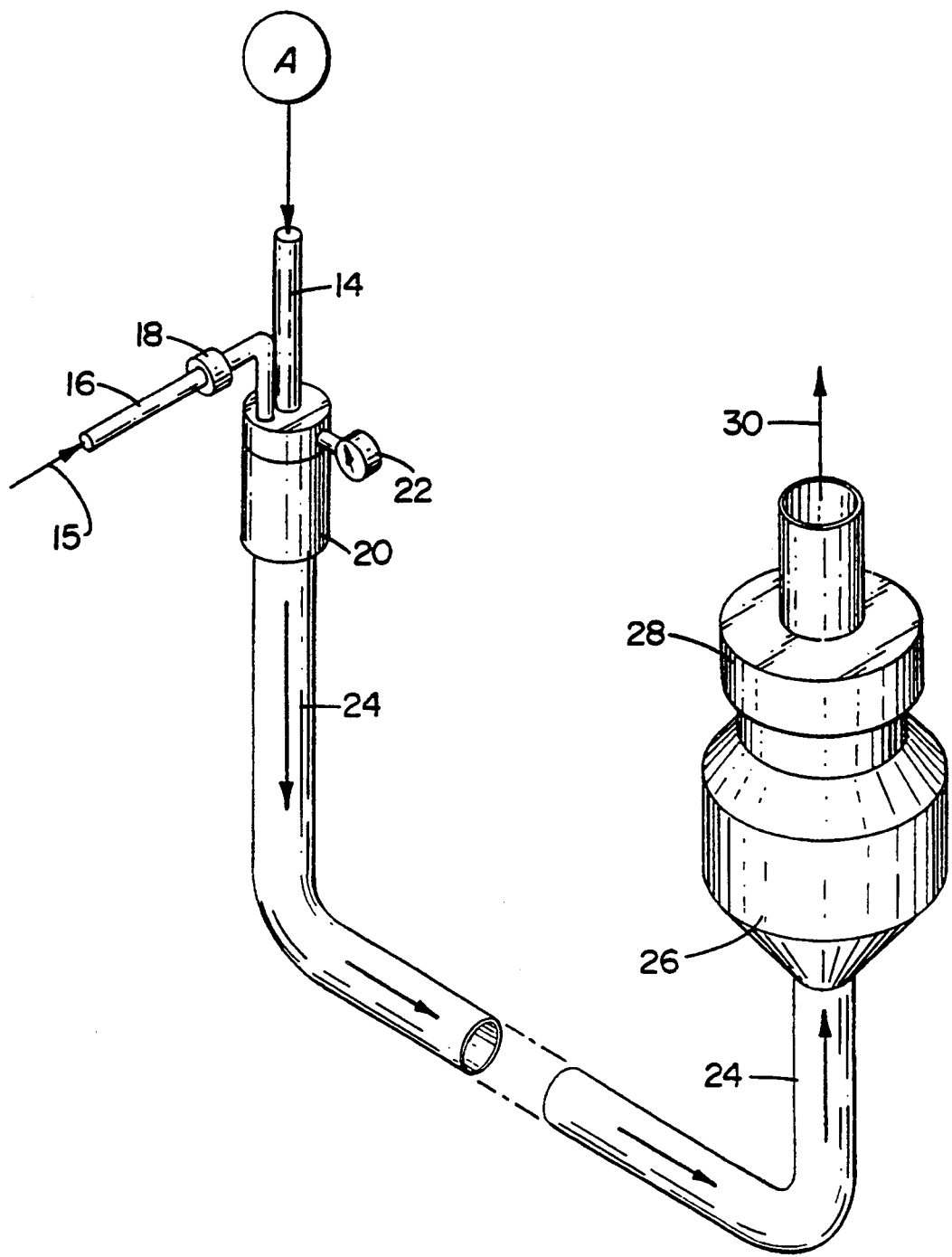
FIG. 3 is a plan view of a filter connected to the exhaust particulate waste connecting device of the current invention.

Still referring to FIG. 2, the operation of the current invention is described in detail. When the disk 1 is rotated by the spindle 7, the focused beam of light is placed at the etching location 8 on the rotating disk 1. Both exhaust and particulate waste materials are produced due to burning of the surface material on the disk 1. As a result, a laser etched track is created on the disk 1 surface. Since the disk 1 is rotated at a high speed, a pumping effect creates an air flow towards the outer edge of the disk near the surface of the disk 1 as indicated by the arrows 9. This air flow transports both exhaust and particulate waste materials towards the outer edge of the disk 1. Another air flow is created by the application of a low pressure air by the vacuum line 5 through the bores 13 on the shroud 4. The air flow indicated by the arrows 10 thus takes place from the outer edge of the disk 1 along the top surface of the platen 3 to the gap 12. The exhaust and particular wastes upon reaching the outer edge of the disk 1 are further transported to the gap 12 by the air flow. The exhaust and particulate wastes are trapped by an HEPA (High Efficiency Particulate Air) filter 26 which is placed in line with the vacuum source 20 as shown in FIG. 3.

A part of the shroud 4 which extends below the platen top surface forms a part of the gap 12. The distance of the gap 12 is a function of a low pressure provided through the vacuum access pipe 5, and/or the distance between the outer edge of the platen 3 and the outer edge of the disk 1. For example, 1/16" of the gap 12 is used with 2" Hg of low pressure air at the flow rate of 6,000 ft.$^3$/minute at the vacuum source for the 1.25" platen top between the outer edge of the disk 1 and the gap 12. Another part of the shroud 4 which extends above the platen top surface forms a cover to prevent the exhaust and particulate waste from spreading into the surrounding air. This part of the shroud 4 also can be extended upward to protect the operator from a direct line of sight to the etching site. A pipe 14 of FIG. 1 is connected to a pipe 14 of FIG. 3 as indicated by "A". Now referring to FIG. 3, the vacuum source 20 of a preferred embodiment further comprises a compressed air source 15 for generating vacuum, a connector 16 for connecting the compressed air source 15, a solenoid valve 18 and a gauge 22 for monitoring the vacuum condition. The air containing exhaust and particulate wastes moves in a pipe 24 towards the HEPA filter 26 as indicated by arrows. After the particulate wastes are removed by the HEPA filter 26, the exhaust is released into atmosphere 30 by a fan 28.

The advantage of the current invention is that since there is no nozzle or tube placed near the site of laser etching, the operator has easy access to the disk when etching is completed. Another advantage is that the movement or timing of the tube or nozzle is independent from that of the etching unit. Thus, the constant adjustment or coordination of the tube or nozzle is not required with respect to the laser positioning arm. Yet, another advantage is that since the application of uniform low pressure air is around the entire edge of the disk, rather than a small area near the etching site, more efficient and thorough collection of exhaust and particulate wastes is accomplished. Lastly, as a result, the operator and the laser etching unit are protected from the hazardous exhaust and particulate waste materials.

Although a particular embodiment of the invention has been shown and described, other embodiments and modifications will occur and those of ordinary skill in the art which fall within the scope of the appended claims.

What is claimed is:

1. Apparatus for removing exhaust and particulate wastes from a floptical medium during laser etching, comprising:

a spindle for rotating said floptical medium at a predetermined angular velocity, said exhaust and said particulate wastes being transported towards an outer edge of said floptical medium by an airflow created by a pumping effect of said rotating floptical medium;

a platen disposed in a parallel plane of said floptical medium for guiding said airflow toward an outer edge of said platen;

a shroud placed around said platen and providing a gap between said outer platen edge and an inner surface of said shroud; and a plurality of vacuum sources connected to said shroud for creating an uniform low pressure through said gap, said uniform low pressure further transporting said exhaust and said particulate wastes from said outer edge of said floptical medium to said gap along a surface of said platen.

2. Apparatus according to claim 1 wherein said gap is uniform around said outer platen edge.

3. Apparatus according to claim 2 wherein said gap is approximately 1/16 inch.

4. Apparatus according to claim 1 wherein said vacuum sources are connected to an outer surface of said shroud.

5. Apparatus according to claim 1 wherein said vacuum sources are connected to a filter for collecting said particulate wastes.

6. Apparatus according to claim 1 wherein said platen is larger than said floptical medium and placed below said floptical medium.

7. Apparatus according to claim 1 wherein said shroud is disposed above said platen and said floptical medium for containing said airflow of said exhaust and said particulate wastes.

8. Apparatus for removing exhaust and particulate wastes from a floptical disk during laser etching of tracks, comprising:
- a spindle for rotating said floptical disk at a predetermined angular velocity, said exhaust and said particulate wastes being transported towards an outer edge of said floptical disk by an airflow created by a pumping effect of said rotating floptical disk;
- a circular platen disposed in a parallel plane of said floptical disk and under said floptical disk for guiding said airflow toward an outer edge of said platen, a diameter of said platen being larger than that of said floptical disk;
- a cylindrical shroud placed around said platen and providing a uniform gap between an outer edge of said platen and an inner surface of said shroud, said shroud extending above and below said platen and said floptical disk, and
- a plurality of vacuum sources connected to an outer surface of said shroud for creating a uniform low pressure through said gap, said uniform low pressure further transporting from said outer edge of said floptical disk to said gap along the surface of said platen.

9. Apparatus according to claim 8 wherein said gap is approximately 1/16 inch.

10. Apparatus according to claim 8 wherein said vacuum sources are connected to a filter for collecting said particulate wastes.

11. Method of collecting exhaust and particulate wastes from a floptical medium during laser etching, comprising the steps of:
  (a) mounting said floptical medium on a spindle;
  (b) rotating said spindle and said floptical medium at a predetermined angular velocity;
  (c) etching a surface of said rotating floptical medium, said exhaust and said particulate wastes being transported towards an outer edge of said floptical medium by an airflow created by a pumping effect of said rotating floptical medium;
  (d) uniformly applying a low-pressure air around an outer edge of said rotating floptical medium during step c) for further transporting said exhaust and said particulate wastes; and
  (e) collecting said further transported exhaust and said particulate wastes in a filter.

12. Method recited in claim 11 wherein said uniform low-pressure air application is provided by vacuuming through a circular gap disposed around said outer edge of said rotating floptical medium.

13. Method recited in claim 11 wherein said uniform low-pressure air is simultaneously applied to an entire outer edge of said rotating floptical medium.

14. Method recited in claim 11 wherein said further transportation of said exhaust and aid particulate wastes is guided by a platen disposed in a parallel plane of said floptical medium towards said low-pressure air.

15. Method recited in claim 11 wherein said further transported exhaust and said particulate wastes are guided by a shroud disposed in a perpendicular plane to said platen toward said-low pressure air.

16. Method recited in claim 11 wherein said filter is a high efficiency particulate air filter.

17. Method recited in claim 11 wherein said etching step and said uniformly applying said low-pressure air step are independent.

18. Method recited in claim 11 wherein said rotation is approximately 3400 RPM.

19. Method of collecting exhaust and particulate wastes from a floptical disk during laser etching of tracks, comprising the steps of:
  a) mounting said floptical disk on a spindle;
  b) rotating said spindle and said floptical disk at a predetermined angular velocity;
  c) etching a surface of said rotating floptical disk, said exhaust and said particulate wastes being transported towards an outer edge of said floptical disk by an airflow created by a pumping effect of said rotating floptical disk;
  d) uniformly applying a low-pressure air around an entire outer edge of said rotating floptical disk through a circular gap disposed around said outer edge during step c) for further transporting said exhaust and said particulate wastes towards said circular gap, said further transportation being guided by a platen disposed in a parallel plane of said floptical medium and a shroud disposed in a perpendicular plane to said platen towards said circular gap; and
  e) collecting said further transported exhaust and said particulate wastes in a filter.

* * * * *